3,012,935
SYNERGISTIC INSECT REPELLENT METHOD AND COMPOSITION
Lyle D. Goodhue, Bartlesville, Okla., assignor to Phillips Petroleum Company, a corporation of Delaware
No Drawing. Filed June 13, 1955, Ser. No. 515,237
4 Claims. (Cl. 167—33)

This invention relates to repelling of insects and to compositions for repelling insects. In one of its aspects, the invention relates to an improved insect repellent composition containing at least one of diethyl, di-n-propyl and di-n-butyl esters of pyridine dicarboxylic acid, especially of pyridine-2,5-dicarboxylic acid, and at least one of 1-acetoxy-3-phenyl-2-butene and 1-acetoxy-3-phenyl-2-propene. In another of its aspects, the invention relates to a method of repelling insects, for example, stable flies, by supplying or applying a composition, as set forth herein, to a locus from which the insect is to be repelled. Other aspects as well as advantages of this invention are apparent from this disclosure and the appended claims. This application is a continuation-in-part of Serial No. 419,110, now abandoned, filed by me March 26, 1954.

The diethyl, di-n-propyl and di-n-butyl esters of pyridine dicarboxylic acid are known to be effective as agents for repelling house flies, stable flies, and other insects from surfaces frequented by the insects when the compounds are applied to such surfaces, as set forth, described and claimed in application Serial No. 240,602, of N. J. Leonard, filed August 6, 1951, now Patent 2,757,120. In that application, it is shown that the said esters are repellent for long periods of time, i.e., several weeks or more. Thus, Example IV of application Serial No. 240,602 shows that in a practical test, esters here discussed repelled both stable and house flies for a period of 2 weeks. The tests later set forth herein are designed to exemplify improvement in effective repellent life. For the absolute repellency values of said esters, the reader is referred to said Serial No. 240,602.

Among the objects of the present invention are the provision of compositions which contain compounds which act to increase the repellency of said esters and a method of applying said compositions to repel insects such as flies. Other objects are apparent from this disclosure and the appended claims.

In Serial No. 436,706, filed June 14, 1954, by Lyle D. Goodhue and James N. Short, now abandoned but continued in application Serial No. 640,337, filed February 15, 1957, there is described the preparation of a compound which was found to be repellent in character. Thus, the compound in question was prepared by treating $\alpha$-methylstyrene with paraformaldehyde in glacial acetic acid. After refluxing for three hours, acetic acid was removed by distillation, the residue was poured into water, washed with dilute potassium carbonate and dried over potassium carbonate. The bulk of the batch was distilled at 0.3 to 1.0 mm. and then fractionated to yield a compound boiling at 112–116° C. at 1.5–2 mm. Hg pressure. The compound which was thus prepared has been identified to be 1-acetoxy-3-phenyl-2-butene. This compound was erroneously stated in copending Serial No. 419,110, the parent of the present application, to be 3-phenyl-1,3-butanediol.

I have discovered the surprising fact that the addition of 1-acetoxy-3-phenyl-2-butene and/or 1-acetoxy-3-phenyl-2-propene to any one of the aforementioned pyridine dicarboxylates, especially to the pyridine-2,5-dicarboxylates, and particularly to di-n-propyl pyridine-2,5-dicarboxylate, causes an increase in repellency to insects to occur. Whether each compound mutually enhances the effectiveness of the other, or whether one of the two compounds greatly enhances the effectivenes of the other is not known. It has now been found, however, that the activity of the combination is greater than the additive activity of each of the ingredients, as measured by the length of time during which the mixture continues to repel the insects. The increase in the length of time during which the repellent composition is effective is sometimes referred to as synergism in this application.

Therefore, according to the present invention, the art has been provided with a novel insect repellent composition of matter comprising essentially at least one of the di-n-alkyl esters of pyridine dicarboxylic acids in which any alkyl group contains from 2 to 4, inclusive, carbon atoms and at least one of 1-acetoxy-3-phenyl-2-butene and 1-acetoxy-3-phenyl-2-propene. According to the invention, at least one of the diethyl, di-n-propyl and di-n-butyl esters of pyridine-2,5-dicarboxylic acid in combination with at least one of said 1-acetoxy-3-phenyl-2-butene and 1-acetoxy-3-phenyl-2-propene are preferred and of these, it is now believed, best results can be obtained with the di-n-propyl ester of pyridine-2,5-dicarboxylic acid and 1-acetoxy-3-phenyl-2-butene.

The proportions in which these compounds are mixed can vary. It appears that an extent of synergism will exist upon admixture of an appreciable proportion of the two essential ingredients of the composition. Preferably, one of the compounds is present in amounts of 25–75 percent by weight of the total mixture. Thus, the proportion by weight of the ester to the synergistic compounds will be usually in the range 1 to 3–3 to 1. It can be present in smaller or larger amounts, however. Some synergistic effect is found with the presence of as little as one percent by weight of one of the said dicarboxylate compounds in the admixture. Combinations of more than one of the aforementioned pyridine-dicarboxylates with 1-acetoxy-3-phenyl-2-butene and/or 1-acetoxy-3-phenyl-2-propene also show a synergistic increase in repellency.

The mixtures of 1-acetoxy-3-phenyl-2-butene and/or 1-acetoxy-3-phenyl-2-propene and at least one of the said esters, the now preferred esters being the pyridine-2,5-dicarboxylic acid esters, can be applied to the desired surfaces in any suitable form, such as a solution in a mutual solvent, as an emulsion, aerosol, fog, and the like, and in any suitable manner, as by spraying, brushing, and the like. Application, according to the invention, can be effected by first applying one of the ingredients of the admixture and then applying the other. For best and now greatly preferred results, in any event, the compositions, as applied, are made up to contain a repellent adjuvant to dilute the active ingredients to an effective, but not undesirably high, concentration.

In general, it is sufficient to deposit about 0.05 to 5 grams of the combination of active ingredients per square foot of surface as on a container. However, larger or smaller amounts can be applied if desired.

The mixtures of our invention are also effective in repelling other insect pests, such as hornflies, mosquitoes, cockroaches, and the like.

EXAMPLE I

Ten moles (1180 grams) of alpha-methylstyrene, 11.0 moles (330 grams) of paraformaldehyde, 39.4 moles (2360 grams) of glacial acetic acid, and 3.6 milliliters of concentrated sulfuric acid were fed to a reactor and reacted for 3 hours by stirring at 35° C. During this period, the temperature rose to 45° C., but was lowered to 35–40° C. and kept in this range for the duration of the run. After the reaction appeared complete, the reaction mixture was poured into one liter of water and extracted with two liters of benzene. This benzene layer was then washed with one liter of water, one liter of 6 N sodium carbonate solution, and one liter of water again. Water and benzene were then distilled through a stripping assembly until the pot temperature reached 200° C. Distillation cuts were then taken from the pot residue, and the material boiling at 125° C. at 5 mm. of mercury absolute pressure was collected. This fraction amounted to 37 grams.

This fraction was then tested to determine its properties and it was found to have a refractive index at 20° C. of 1.5320–1.5330, and gave positive results when tested for unsaturation. This material also gave positive results when tested by the ferric hydroxamate ester test, and its molecular weight as determined by its bromine number was found to be 182. Hydrolysis of a portion of this material gave acetic acid as one product, proved by forming the S-benzylthiouronium salt of acetic acid. The prepared salt had a melting point of 132–134° C. as compared with the value given in the literature of 134° C.

Infrared and ultraviolet spectrum analyses were run on both the unhydrolyzed material and on the non-acid product of hydrolysis. The spectrum of the unhydrolyzed material indicated that it was a phenylacetoxybutene, while the spectrum data on the non-acid hydrolysis product was found to be consistent with the structure of 3-phenyl-2-buten-1-ol. An elemental analysis was then run on this non-acid hydrolysis product. The empirical formula for 3-phenyl-2-buten-1-ol is $C_{10}H_{12}O$ which was calculated to have a carbon percentage of 81.04 and a hydrogen percentage of 8.16. The results of the elemental analysis indicated a carbon percentage of 81.2 and a hydrogen percentage of 8.38.

All of these analyses indicated that the compound was 1-acetoxy-3-phenyl-2-butene. An elemetnal analysis was run to check this conclusion. The calculated percentages of carbon and hydrogen for $C_{12}H_{14}O_2$ are carbon—75.79 and hydrogen—7.39. The analytical results gave carbon—75.67 and hydrogen—7.13. A further check was made by the saponification equivalent which was found to be 198, a close check for the calculated value of 190. The calculated molecular weight for this compound is 190.

EXAMPLE II

Organdy bags having 100 square inches of area were impregnated with the desired amount of chemical dissolved in 6 to 7 ml. of acetone and were then suspended on a line to dry. After 24 hours, the bags were drawn over the hand and exposed to several thousand hungry stable flies *Stomoxy calcitrans* (Linn.) confined in 30-inch cubial cages. The stable flies were starved for several hours prior to carrying out the repellency tests. The organdy bags which were employed did not contain any material on which the flies could feed and therefore when unimpregnated had neither repellency nor attraction for the stable flies. However, since the flies were relatively hungry they would bite the hand through the bag as soon as it was inserted into the cage unless some powerful repelent was covering the hand. In fact, the hungry flies would bite a hand which was placed outside the cage but against the screen wire used in fabrication of the cage. The flies were those reared accordingly to the method of Campau et al., described in a paper presented before the American Association of Economic Entomologists, Cincinnati, December 12–15, 1951. The time to the first bite was recorded. If no bites were received in five minutes, the bag was withdrawn and shortly thereafter reinserted into the cage for a second five minute period. This was repeated until the bag had been inserted for a total of three successive five minute periods. On following days, three additional successive tests were made. Generally the flies bit in less than a minute if they bit at all. Since the flies would bite through the bag when there was no repellent present, it is clear that the bag material, per se, did not influence the test results.

Table 1 below giving the results on two compounds alone and on a mixture of the two compounds shows the synergistic effect obtained when a mixture is used.

*Table 1*

REPELLENCY OF CHEMICALS AND THEIR 1-1 MIXTURES TO STABLE FLIES

| Name of Chemical | Grams of Chemical per 100 sq. in. Fabric | Successive Trial Number | Seconds to First Bite—Bags Ages | | | | | |
|---|---|---|---|---|---|---|---|---|
| | | | 1 Day | 2 Days | 3 Days | 4 Days | 5 Days | 6 Days |
| 1-acetoxy-3-phenyl-2-butene | 1.0 | 1 | [1] NB | NB | NB | 38 | | |
| | | 2 | NB | NB | NB | 28 | | |
| | | 3 | NB | NB | NB | 11 | | |
| Di-n-propyl pyridine-2,5-dicarboxylate | 1.0 | 1 | NB | NB | 200 | 145 | | |
| | | 2 | NB | NB | 180 | 268 | | |
| | | 3 | NB | NB | 210 | 36 | | |
| Mixture: | | | | | | | | |
| 1-acetoxy-3-phenyl-2-butene | 0.5 | 1 | NB | NB | NB | NB | NB | NB |
| Di-n-propyl pyridine-2,5-dicarboxylate | 0.5 | 2 | NB | NB | NB | NB | NB | NB |
| | | 3 | NB | NB | NB | NB | NB | NB |

[1] NB=no bites in 5 minutes.

The bags used in each test were made up identically and were, of course, of the same material or organdy.

EXAMPLE III

Repellency to houseflies was determined by the Sandwich Bait method which is essentially that described by L. B. Kilgore in Soap, June 1949. In accordance with this method, to a sheet of cardboard were applied two smooth thin strips of unsulfured molasses about ⅜ inch wide and 3½ inches long, leaving a margin of at least ¼ inch all around and a space of at least an inch between the strips. The prepared cardboard strips were then oven-dried at 45° C. Strips of highly porous lens paper, 1 x 4 inches in dimensions, were impregnated with the chemical to be tested as a fly repellent by immersing them in an acetone solution containing the desired quantity of the chemical and then allowing the strips to dry over a period of from 4 to 6 hours. An impregnated strip was superimposed on each strip of molasses and was fastened in place by stapling it to the cardboard backing. The loose fiber construction of the impregnated paper permits the fly to remove the molasses through it.

The prepared strips, i.e., the sandwich bait, were then exposed to houseflies (*Musca domestica*), over 5 days old, which had been starved for 6 hours. Counts of the number of flies feeding on the strips were taken periodically for 2½ hours. A nonrepellent material in the sandwich bait becomes black with flies soon after being exposed and the bait will often be consumed entirely in 5 minutes.

The results of tests made in accordance with the method described above are tabulated as follows:

Reasonable variation and modification are possible within the scope of the foregoing disclosure and the appended Table 2

REPELLENCY OF CHEMICALS AND THEIR 1-1 MIXTURES TO HOUSE FLIES

| Chemical | Concentration of Chemical in Dipping Solution, Percent | Number of Flies Feeding After Indicated Minutes | | | | | | | |
|---|---|---|---|---|---|---|---|---|---|
| | | 5 | 15 | 30 | 45 | 60 | 90 | 120 | 150 |
| 1-acetone-3-phenyl-2-butene | 1.0 | 20 | 32 | 29 | 16 | 10 | 3 | 1 Gone | |
| Di-n-propyl pyridine-2,5-dicarboxylate | 0.12 | 0 | 0 | 0 | 1 | 6 | 16 | 4 | 1 Gone |
| Mixture: | | | | | | | | | |
| 1-acetoxy-3-phenyl-2-butene | 0.12 | | | | | | | | |
| Di-n-propyl pyridine-2,5-dicarboxylate | 0.12 | 0 | 0 | 0 | 0 | 0 | 0 | 2 | 0 |

¹ Gone=molasses consumed.

The 1-acetoxy-3-phenyl-2-butene which was used in Examples II and III hereof was prepared as described in Example I hereof. Infra-red examinations (scannings) on the compound prepared as described in Example I hereof and erroneously set forth in Serial No. 419,110 as being 3-phenyl-1,3-butanediol and on the compound prepared in Example I hereof showed that the two materials were the same compound.

Results similar to those obtained, as set forth in the above examples, with 1-acetoxy-3-phenyl-2-butene can be obtained using 1-acetoxy-3-phenyl-2-propene in lieu of 1-acetoxy-3-phenyl-2-butene or in partial replacement of said 1-acetoxy-3-phenyl-2-butene.

The esters disclosed herein to exhibit synergism with the 1-acetoxy-3-phenyl-2-butene and/or with the 1-acetoxy-3-phenyl-2-propene disclosed herein are considered alternatives in respect of the effect obtained and are not necessarily equivalents. Indeed, the di-n-propyl pyridine-2,5-dicarboxylate is now preferred. Therefore, although the dicarboxylates herein set forth are set forth together, they are not considered at the present time as being more than alternatives which do not interfere with the action of each other as already stated.

Solvents or carriers which can be employed for the repellents of this invention include hydrocarbons such as kerosene, naphthas, the isoparaffinic fractions sold under the trademark Soltrol; and organic solvents such as acetone and the like. The repellents can also be applied in an aqueous emulsion, or they can be admixed with talc or similar material and applied as a dust. Any solvent ordinarily useful for distributing insect repellents and having no deleterious effect on these specific repellents can be employed. Generally, the repellent adjuvants known in the art can be employed; however, those set forth are now preferred.

The synergistic compounds used according to the present invention have the following formulas:

I

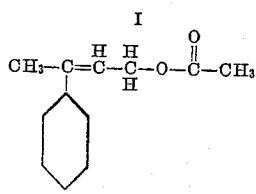

1-acetoxy-3-phenyl-2-butene

II

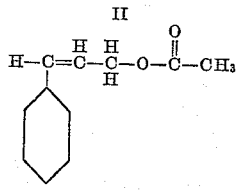

1-acetoxy-3-phenyl-2-propene claims to the invention, the essence of which is that the di-n-alkyl esters of pyridine dicarboxylic acids, in which any alkyl group contains 2-4 carbon atoms, for example, the diethyl, di-n-propyl and/or di-n-butyl esters of pyridine dicarboxylic acids, especially of pyridine-2,5-dicarboxylic acid, have been found to exhibit synergism in the repelling of insects when admixed with 1-acetoxy-3-phenyl-2-butene and/or with 1-acetoxy-3-phenyl-2-propene.

I claim:

1. A synergistic repellent composition comprising at least one of the diethyl, di-n-propyl and di-n-butyl esters of pyridine-2,5-dicarboxylic acid incorporated with 1-acetoxy-3-phenyl-2-butene in a proportion of 1:1.

2. A method of repelling an insect which comprises subjecting the locus from which the insect is to be repelled to the action of a repellent composition comprising at least one of the group consisting of diethyl, di-n-propyl and di-n-butyl esters of pyridine-2,5-dicarboxylic acid incorporated with 1-acetoxy-3-phenyl-2-butene in a proportion of 1:1.

3. A synergistic insect repellent composition comprising at least one of the diethyl, di-n-propyl and di-n-butyl esters of pyridine-2,5-dicarboxylic acid incorporated with 1-acetoxy-3-phenyl-2-propene in a proportion of 1:1.

4. A method of repelling an insect which comprises subjecting the locus from which the insect is to be repelled to the action of a repellent composition comprising at least one of the diethyl, di-n-propyl and di-n-butyl esters of pyridine-2,5-dicarboxylic acid incorporated with 1-acetoxy-3-phenyl-2-propene in a proportion of 1:1.

References Cited in the file of this patent

UNITED STATES PATENTS 2,043,941    Williams             June 9, 1936
2,757,120    Leonard             July 31, 1956

OTHER REFERENCES

Prostenik et al.: Archiv Kemi., vol. 18, pp. 3 to 9, 1946 (Chemical Abstracts, vol. 42, 3398C, 1948).

OSRD Insect Control Committee Report No. 28, Interim Report No. 0-94, May 18, 1945, Publication date: Aug. 1, 1947, 50 pages plus one page of index, particularly at page 27, Orlando No. 0-2333, Pyridine-2,3-dicarboxylic acid, dimethyl ester, and pages 1-4, 9, 16 and 21.

Wadley: United States Department of Agriculture, "The Evidence Required to Show Synergistic Action of Insecticides and a Short Cut in Analysis" (ET-223); all pages.

Synergism and Antagonism as Displayed by Certain Anti-Bacterial Substances, The Lancet, vol. 2, pp. 46-50 July 8, 1950.